United States Patent
Seggio et al.

(10) Patent No.: US 9,840,832 B2
(45) Date of Patent: Dec. 12, 2017

(54) TOUCHLESS, REMOTELY ACTIVATABLE ASSEMBLY FOR FLUID FLOW REGULATION, RELATED SYSTEMS AND METHODS

(71) Applicant: AS IP Holdco, LLC, Piscataway, NJ (US)

(72) Inventors: Frank Seggio, Wayside, NJ (US); Walter Pitsch, Washington, NJ (US)

(73) Assignee: AS IP Holdco, LLC, Piscataway, NJ (US)

( * ) Notice: Subject to any disclaimer, the term of this patent is extended or adjusted under 35 U.S.C. 154(b) by 543 days.

(21) Appl. No.: 14/205,566

(22) Filed: Mar. 12, 2014

(65) Prior Publication Data

US 2014/0345726 A1    Nov. 27, 2014

Related U.S. Application Data

(60) Provisional application No. 61/791,587, filed on Mar. 15, 2013, provisional application No. 61/844,610, filed on Jul. 10, 2013.

(51) Int. Cl.
*E03C 1/05* (2006.01)
*F16K 11/00* (2006.01)

(52) U.S. Cl.
CPC ............ *E03C 1/057* (2013.01); *F16K 19/006* (2013.01); *Y10T 137/87684* (2015.04);
(Continued)

(58) Field of Classification Search
CPC ............. E03C 1/057; Y10T 137/87684; Y10T 137/9464; Y10T 137/87925; F16K 19/006
See application file for complete search history.

(56) References Cited

U.S. PATENT DOCUMENTS

| | | | | |
|---|---|---|---|---|
| 5,351,347 A | * | 10/1994 | Kunkel | ................... E03C 1/057 137/607 |
| 6,219,859 B1 | * | 4/2001 | Derakhshan | ............ E03C 1/052 137/599.01 |

(Continued)

*Primary Examiner* — Atif Chaudry
(74) *Attorney, Agent, or Firm* — Morrison & Foerster LLP

(57) ABSTRACT

The invention includes an assembly for remotely controlling fluid flow between a fluid source, such as a water source, and an outlet that includes at least one electrically operable valve, such as an electromagnetically-actuatable valve, to be interposed between the fluid source and the outlet, the valve being actuatable between an open position, in which the source and the outlet are fluidly connected, and a closed position in which the source and the outlet are not fluidly connected; at least one actuator, such as a solenoid actuator, operably connected to the at least one valve for actuating the valve between the open and closed positions; a controller comprising a receiver for receiving a wireless signal, wherein the controller is operably connected to the actuator and capable of actuating the actuator upon receipt of a wireless signal by the receiver; and an activator device comprising (i) a user-activatable sensor for detecting a stimulus when the stimulus enters a detection zone and (ii) a transmitter that transmits the wireless signal upon activation of the sensor by a user to the receiver. In an embodiment, it may be desirable that the electrically operable valves are also mechanically actuatable or that one or more (additional) manually activatable valves in included in the assembly.

33 Claims, 11 Drawing Sheets

(52) U.S. Cl.
CPC .............. *Y10T 137/87917* (2015.04); *Y10T 137/87925* (2015.04); *Y10T 137/9464* (2015.04)

(56) References Cited

U.S. PATENT DOCUMENTS

| | | | |
|---|---|---|---|
| 6,508,272 B1 | 1/2003 | Parsons et al. | |
| 2006/0214016 A1* | 9/2006 | Erdely | G05D 23/1393 236/12.12 |
| 2009/0209285 A1* | 8/2009 | McMahan | H04M 1/67 455/556.1 |
| 2011/0185493 A1* | 8/2011 | Chen | E03C 1/057 4/623 |
| 2012/0017367 A1* | 1/2012 | Reeder | E03C 1/057 4/597 |

\* cited by examiner

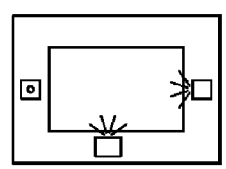 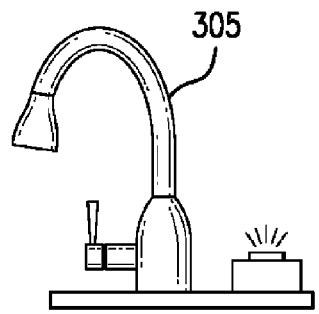 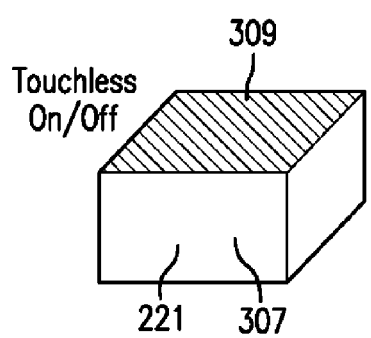
FIG. 5A        FIG. 5B        FIG. 5C
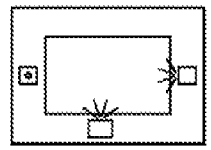 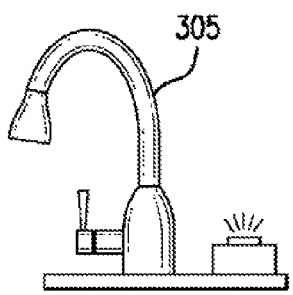 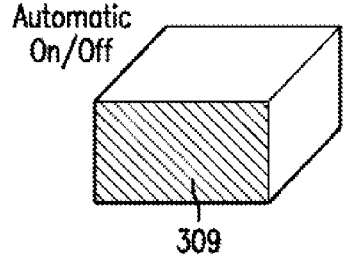
FIG. 6A        FIG. 6B        FIG. 6C

TOUCHLESS, REMOTELY ACTIVATABLE ASSEMBLY FOR FLUID FLOW REGULATION, RELATED SYSTEMS AND METHODS

CROSS-REFERENCE TO RELATED APPLICATIONS

This application claims the benefit of priority under 35 U.S.C. §119(e) to each of U.S. Provisional Patent Application Nos. 61/791,587, filed Mar. 15, 2013, and 61/844,610, filed Jul. 10, 2013, each entitled "Touchless, Remotely Activatable Assembly or Fluid Flow Regulation, Related Systems and Methods", the contents of each of which are incorporated herein by reference.

BACKGROUND OF THE INVENTION

The invention as described herein generally relates to systems and assemblies to remotely control fluid flow, for example, water flow through a faucet in a consumer, industrial or institutional setting. Recent lifestyle trends have begun to emphasize the desirability of "hands free" or touchless automatic faucets. These trends include, for example, medical and technological advances that permit handicapped or physically challenged persons to live on their own, a greater emphasis on kitchen sanitation and avoidance of cross contamination of food products and increased desire to live in a more environmentally conscious manner (e.g., reduce or eliminate unnecessary water usage).

Conventional "touchless" systems exist, but typically include a water flow activator that is fixed, either to the faucet itself, or in close proximity to the faucet, such as next to a sink or affixed to a vanity. These arrangements limit the flexibility of the touchless system since a user must be in close proximity to the water source to activate the system. Accordingly, these systems are significantly less useful when the user is not in close proximity to the fluid outlet or sink or cannot physically orient him- or herself to activate the sensor (for example, a wheelchair-bound user who cannot reach the fixed sensor from a seated position).

Moreover, most prior art touchless systems sensors cannot be retro-fitted into existing installed conventional faucets. To the contrary, user must apply significant resources to purchase and install an entirely new system—a time consuming and expensive proposition, especially if the system includes a sensor that must be fixed in the vanity or counter surface.

In addition, while some users appreciate the ability to touchlessly operate water flow, others may find it simpler or more efficient to manually operate the faucet using the conventional single or dual mechanical valves for adjusting water flow. In many touchless systems, the manual operation option is not available, resulting in inconvenience should the power source of the sensor fail or in the general annoyance of the user, should he or she prefer to operate the water flow manually.

Thus, in the field of touchless systems, one finds that there remains an unmet need for a touchless system having a remotely locatable sensor that allows for remote control of fluid flow, and which is capable of facilitating fluid delivery in a manual mode and in a touchless mode, according to the user's need or desire.

BRIEF SUMMARY OF THE INVENTION

The invention includes an assembly for remotely controlling fluid flow between a fluid source, such as a water source, and an outlet that includes at least one electrically operable valve, such as an electromagnetically-actuatable valve, to be interposed between the fluid source and the outlet, the valve being actuatable between an open position, in which the source and the outlet are fluidly connected, and a closed position in which the source and the outlet are not fluidly connected; at least one actuator, such as a solenoid actuator, operably connected to the at least one valve for actuating the valve between the open and closed positions; a controller comprising a receiver for receiving a wireless signal, wherein the controller is operably connected to the actuator and capable of actuating the actuator upon receipt of a wireless signal by the receiver; and an activator device comprising (i) a user-activatable sensor for detecting a stimulus when the stimulus enters a detection zone and (ii) a transmitter that transmits the wireless signal upon activation of the sensor by a user to the receiver. In an embodiment, it may be desirable that the electrically operable valves are also mechanically actuatable or that one or more (additional) manually activatable valves in included in the assembly.

Also included are hybrid touchless/mechanical systems that allow both touchless (wireless) control of fluid flow and mechanical control of fluid flow. The system includes at least one electrically operable valve, such as an electromagnetically actuable valve, interposed between the fluid source and the outlet, the valve is actuatable between an open position and a closed position; at least one actuator, such as a solenoid actuator, operably connected to the at least one valve for actuating the valve between the open and closed positions; a controller comprising a receiver for receiving a wireless signal, wherein the controller is operably connected to the actuator and capable of actuating the actuator upon receipt of a wireless signal by the receiver; an activator device comprising (i) a user-activatable sensor for detecting a stimulus when the stimulus enters a detection zone and (ii) a transmitter that transmits the wireless signal upon activation of the sensor by a user to the receiver; and at least one mechanically actuatable valve interposed between the fluid source and the outlet, wherein the mechanically actuatable valve is actuatable between an open position and a closed position; wherein, when the at least one electromagnetically actuatable valve is maintained in the open position, a user can regulate fluid flow to the outlet using the at least one mechanically actuatable valve and when the at least one mechanically actuatable valve is maintained in an open position, a user can regulate the fluid flow to the outlet by generating a stimulus in the zone of detection.

Related kits and methods are also included.

BRIEF DESCRIPTION OF THE SEVERAL VIEWS OF THE DRAWINGS

The foregoing summary, as well as the following detailed description of the various embodiments of the invention, may be better understood when read in conjunction with the appended drawings. It should be understood that the invention is not limited to the precise arrangements and instrumentalities shown in the drawings. In the drawings:

FIGS. 5A, 5B and 5C illustrate an additional embodiment of the invention wherein the activator device includes a position-sensitive sensor allowing for varied remote operation of the assembly in a first position;

FIG. 5A is a plan view of the assembly in situ around a sink;

FIG. 5B is a view of the system, including sensor;

FIG. 5C is a view of the sensor, in a "touchless on/off" position;

FIGS. 6A, 6B and 6C illustrate an additional embodiment of the invention wherein the activator device includes a position-sensitive sensor allowing for varied remote operation of the assembly in a second position;

FIG. 6A is a plan view of the assembly in situ around a sink;

FIG. 6B is a view of the system, including sensor;

FIG. 6C is a view of the sensor, in a "automatic on/off" position;

FIG. 7A is a plan view of the assembly in situ around a sink;

FIG. 7B is a view of the system, including sensor;

FIG. 7C is a view of the sensor placed face down, in "manual" position;

FIG. 10A illustrates activation on the assembly, in an "up" position;

FIG. 10B illustrates activation on the assembly, in a "forward" position;

DETAILED DESCRIPTION OF THE INVENTION

Figure 1:
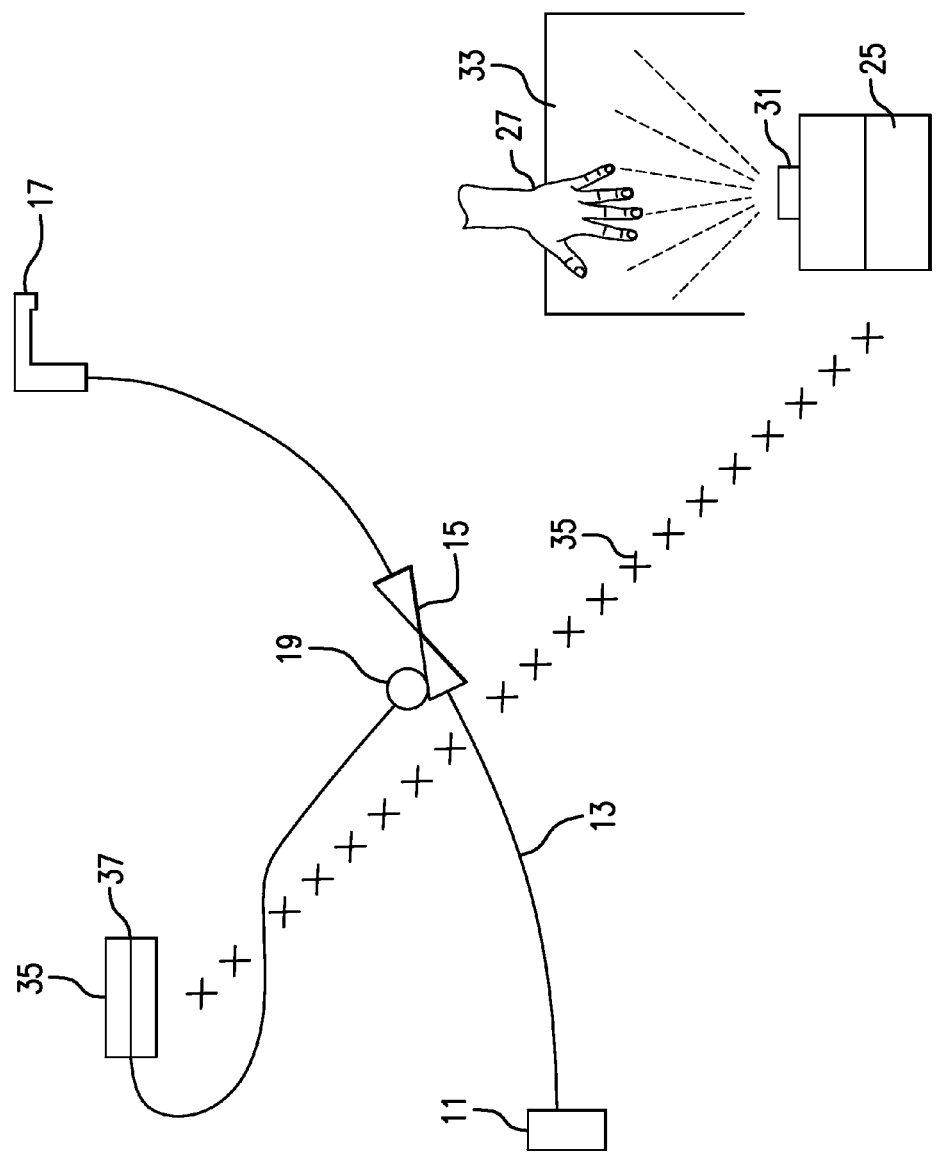
FIG. 1 is a schematic representation of the system of the invention illustrating an embodiment having a single electromagnetically actuatable valve.

The invention described herein includes assemblies to remotely control fluid flow (such as water flow) between a fluid source and an outlet, such as, for example, a kitchen or bathroom sink or tub faucet, a showerhead, a utility sink, a service sink, a water fountain or other outlet from which water or other fluids flow. In one embodiment, the invention includes assemblies that may be retro-fitted onto existing, pre-installed mechanical valve faucet systems in situ (for, example, in a consumer kitchen sink or an industrial lab sink). Alternatively, the assemblies may be integrated with a conventional mechanical valve faucet system and subsequently installed as a single unit.

Also contemplated within the scope of the invention are systems that include the assemblies of the inventions (as described herein) as well as the mechanically actuatable water supply valves, such that the systems permit regulation of water flow through both manual and touchless (wireless) modes of action by the user.

When connected to a water source and a fluid outlet, such as a faucet, the assembly of the invention permits a user to remotely control flow of water or other fluid between the fluid source and an outlet. The assembly includes an electrically-operable valve, such as an electromagnetically actuatable valve that, upon installation, is interposed between a fluid source and an outlet. The valve is actuatable between an open position and a closed position. If the electrically-operable valve is an electromagnetically actuatable valve, the assembly may also include an electromagnetic actuator (preferably a solenoid actuator) that is connected to the valve and is capable of actuating the valve between the open and the closed position. The assembly may further include a controller that includes a receiver to receive a wireless signal and which is operably connected to the actuator (e.g., the solenoid actuator); and (iv) an activator device that includes a sensor (to sense a stimulus in a detection zone) and a transmitter that transmits a wireless signal when the sensor senses the stimulus. These components are described in detail below, as are the systems and methods that incorporate them.

The invention in its various embodiments offers numerous advantages over both prior art conventional, mechanical faucet systems and handsfree water flow regulation systems. For example, since the activator device of the assembly is self-contained; it therefore provides flexibility to the user. It is not attached to the faucet or to a fixed location in the faucet area. Thus, the activator device is moveable and can be placed at variable remote locations as desired by the user to accommodate his or her specific application requirement or comfort.

In an embodiment the activator device is not permanently attached to the assembly, but it may be removably or detachably affixed to the assembly. That is, when the assembly is not in use to supply fluid, the activation device may be maintained at a "home" position where it is affixed to or rests upon the assembly. By "detachably affixed" or "removably affixed", it is meant that when placed in the home position the activator will remain securely in place, but it can be removed from home position by application of minimal force by the user, and subsequently replaced in home position. The mechanism used to removably of detachably affix the activator device may be any known developed in the art. For example, without limitation, the activator device may be attachable or connectable to the assembly by simple mechanical device (prong(s), hook(s), snap(s), tie(s), mechanical/gravity tracing, loop(s), VELCRO®, etc.) friction, magnets, and the like.

In some embodiments, a portion of the assembly is adapted to substantially conform to one or more dimensions of the activator device, such that the portion defines a space that receives the activator device. Such portion may be, for example, a cradle, box or half-bow or detent. FIG. 6 provides an exemplary representation of a system of the invention in which the assembly bears a portion near the left hand side of the faucet 305 that is shaped to receive the activator device, which is housed in a polygonal housing. As seen in the Figure, the activator device 221 is detachably affixed to the assembly.

As a non-limiting example, in an embodiment, the activator device may have the format of a rectangular prism. In such embodiment, a portion of the assembly may comprise a "cradle"-like structure of a bottom surface and at least one side-wall. The space defined by the at least one side-wall, for example three sidewalls, receives and maintains the activator device. The portion of the assembly so-configured may be present alone, or used in combination with the other mechanisms described above (hooks, magnets, etc.) to maintain the activation device in "home" position. In another additional embodiment, the assembly may include an activator device that contains a sensor that is in direct electrical communication (i.e., "hard-wired") to the solenoid activator(s) when the device is affixed to the assembly. Thus if the transmitter fails or temporarily lacks power, the activator is still useable to control fluid flow.

In an embodiment, the activator device does not require any switches, buttons, etc. that require fine manipulation to operate; it can be easily used by those with degraded fine motor skills or by service animals providing aid to handicapped individuals.

Any use of the term "connections," "connecting", "connected", etc., herein is intended to encompass both a direct connection between the components discussed (i.e., "part a" in physical contact with "part b") and an indirect connection (i.e., "part a" in physical contact with one or move intervening parts or a connecting space before physical connection with "part b" is made).

FIG. 1 is a schematic representation of a system of the invention illustrating an embodiment having a single electromagnetically actuatable valve. Referring to FIG. 1, the electromagnetically actuatable valve 15 is placed between the fluid source 11 and the outlet 17. It is connected to the solenoid actuator 19, which contains a solenoid mechanism for electromagnetically actuating the electromagnetically actuatable valve 15 between a closed position and an open position.

The fluid source may be any from which a fluid flow originates, for example, a municipal water supply, a well, a river, and/or an aqueduct. In some embodiments, particularly if the invention is used in food service or industrial chemical applications, the fluid source may be a tank, reservoir or other production machinery that transports or delivers fluids.

The electromagnetically actuatable valve may be any known in the art that is (i) capable of alternating between a closed position at which fluid flow along a fluid line (e.g., 13) is stopped or reduced (as desired) and an open position at which fluid flow to the outlet 17 is permitted and (ii) which may be actuated by an electromagnetic mode of action, such as by a solenoid. The electromagnetically actuatable valve may be, for example, a two-port valve a three port valve, a direct acting valve and/or a diaphragm piloted valve. Valves having any type of actuator (e.g., plunger, pivoted armature, rocker) may be used. Suitable valves may include, for example and without limitation, those described in U.S. Pat. No. 6,508,272, the contents of which are incorporated herein by reference.

In some embodiments, the valve may be capable of both electromagnetic and mechanical actuation. Moreover, although the illustrative embodiment of FIG. 1 is uses an electromagnetically actuatable valve, such valve in FIG. 1 and any such valves described throughout this application (including in the claims) may simply be an electrically operable valve—that is, any valve actuated at least in part via an electrical impulse. Examples include, but are not limited to, an electromechanically operated valve and electromagnetically actuatable valve described with respect to FIG. 1.

As shown in FIG. 1, in the system of the invention the electromagnetically actuatable valve is interposed between the fluid source 11 and the fluid outlet 17. In an embodiment of the invention, the fluid originates from fluid source 11 and is carried through a pipe, line or other conduit 13 that terminates, either directly or indirectly at outlet 17.

The activator device 21, which contains both a sensor 31 and a transmitter 25 is placed at a location remote from the outlet 17 from which the fluid will flow. In an embodiment, it is not permanently affixed to any site, but can be moved, rotated, flipped, or otherwise manipulated as desired for flexibility of use.

For example, in an embodiment, the activator device is placed on the floor surface of a residential kitchen, enabling regulation of water flow to a kitchen sink by a service animal.

The activator device may be placed at any location with the only limitation being that the distance between the receiver of the controller and the transmitter of the activator device must not be greater than a signal is capable of travelling. As will be understood by a person of skill in the art, such distance will vary depending on the nature and type of wireless signal being generated and any physical structures that may shield the receiver or the transmitter. However, determination of a suitable distance is well with the skill of an ordinarily skilled person in the art. For example, typical radio frequency signals that are used in consumer/residential applications are capable of traveling distances of about 20 feet to about 70 feet.

The sensor may be any known or to be developed in the art that is capable of detecting a user-generated stimulus with a zone of detection, that is, a space surrounding the sensor. Exemplary sensors include those that are capable of detecting, for example motion, the presence/absence of a opaque object, sound (especially in targeted frequencies), degrees of changes in temperature, light, and electromagnetic field and alterations in reflected energy and/or the presence/absence of any of these. Others include but are not limited to active infra-red, capacitance detection, optical detection, and/or thermal detection. The "sensor" as used herein may include a single sensor (that is, a device capable of 'sensing' a sole type of stimulus, e.g., heat) or a sensor having multiple capabilities (that is, a device capable of 'sensing' and/or distinguishing among one or more categories of stimuli, e.g., as sensor that senses heat and light, or a sensor with a long range zone of detection and a sensor that has a short range zone of detection).

In a preferred embodiment, the user-generated stimulus may be the placement or movement of a hand or other mammalian or avian body part within the zone of detection. In such case, the sensor is preferably a radar-based motion detector or an infrared detector, either passive or active.

In another embodiment, the user-generated stimulus may be a sound in a specified frequency. In such case, the sensor is preferably a microphone and frequency filter assembly adapted to detect only the target stimulus frequency (for example, to detect sound in the frequency ranges of 80-300 Hz (average frequency of human voice), 130-170 Hz (average frequency of canine command bark); 2200-2800 Hz (average frequency of human hand clap).

The activator device contains a transmitter that (upon activation) wirelessly transmits a signal that is received by the receiver in the valve controller. The signal generated by the transmitter and received by the receiver may be any known or to be developed in the art. In a preferred embodiment, it may be desirable that the signal is a radio frequency (RF) signal.

In some embodiments, it may be desirable that the activator device includes a power source and a housing into which the component parts of the activator device are situated. The power source may be any known or developed; exemplary power sources may include a battery, electricity obtained through a standard wall outlet, a solar cell, and the like. In an embodiment, it may be preferred that the activator including a rechargeable power source. If so, the assembly may include a charging station or other device/component to recharge or renew the power source. The charging station or other device maybe a separate component of the assembly, or it may be integrated into the assembly. For example, in embodiments where the activator device is detachable affixed to the assembly, the charging station may be at the point of affixation so the power source can recharge or renew when in home position.

If the activator device components are housed in a housing, it may be desirable that the housing is aesthetically pleasing, in design and/or color, especially if the assembly or device of the invention is intended for the consumer market.

Referring to FIG. 1, when a user generates a stimulus 27 within the zone of detection 33 of the sensor 31, the sensor causes the transmitter 25 to generate a signal 35.

The signal 35 travels wirelessly to the vicinity of the controller 35. The controller comprises a receiver 37 that is operably connected to the solenoid actuator 19. Upon receipt of the signal 35, the controller actuates the actuatable valve 15 to the open or closed position (depending on the initial state of the valve). The controller may be located adjacent to or in close proximity to the assembly or system or it may be concealed inside of a cabinet or vanity and in operable connection with the actuatable valve via wiring (e.g., wire 41) or other physical or electromechnical connection. The controller may also include a power source and/or a housing. Suitable power sources include batteries, electricity via a standard household outlet, solar power and the like.

Figure 2:
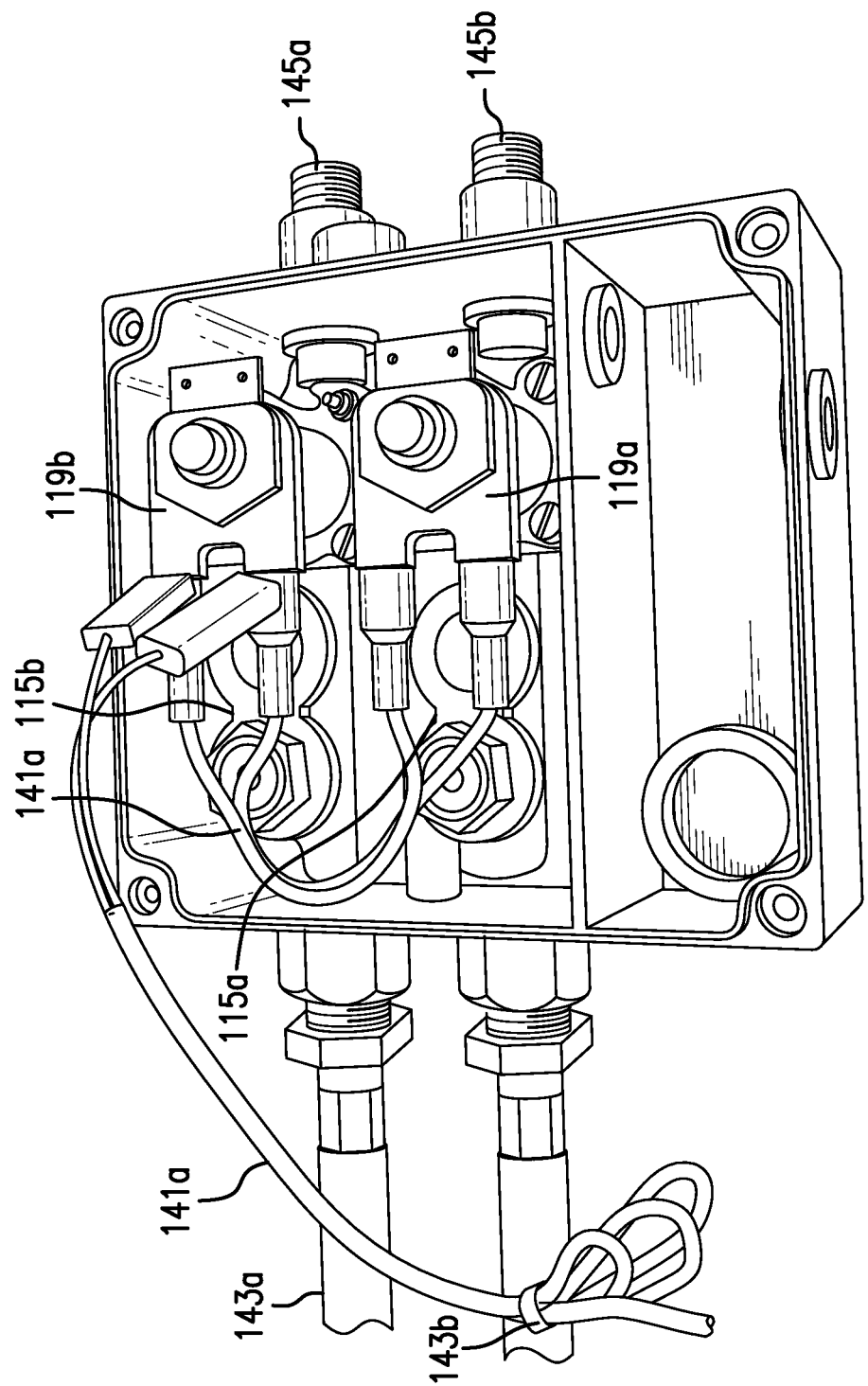
FIG. 2 provides a photographic representation of a portion of a system of the invention.

In an alternative embodiment, the assembly includes more than one actuatable valve arranged in a manifold, for example two actuatable valves. FIG. 2 provides a photographic representation of a portion of a system of the invention. Two actuatable valves 115a, 115b are assembled in a manifold 139, each adjacent to a solenoid actuator 119a, 119b to actuate the valves 115a, 115b. Each valve 115a, 115b is disposed along a fluid line through which will flow hot or cold water (115a and 115b, respectively). Since FIG. 2 shows only a portion of the system, truncated fluid lines are visible (having ends labeled 143a, 143b and 145a, 145b). In practice, the fluid lines are continuous, terminating at the fluid source (not shown) on one end and at the outlet (not shown) on the other. In FIG. 2 each of the solenoid actuators 119a, 119b is in operable connection with a single controller (not shown) via wiring 141a. Thus, in this embodiment, a single signal sent by the activator device may serve to actuate both actuatable valves substantially simultaneously. However, in alternative embodiments, it may be desirable to use more than one controller. In some embodiments, the valves may be mechanically and electromagnetically actuatable.

Figure 3:
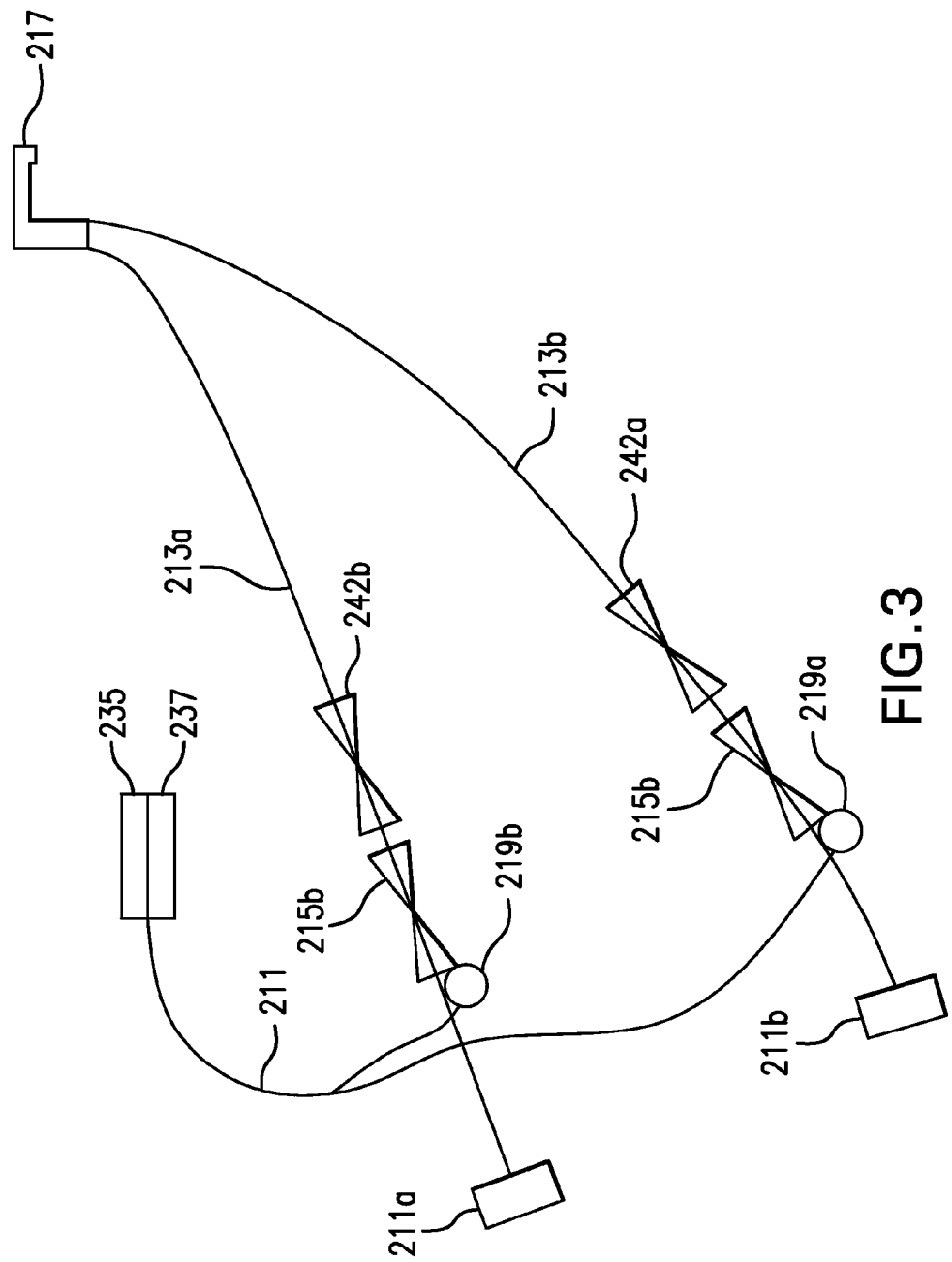
FIG. 3 is a schematic representation of an embodiment of the system including two electromagnetically actuatable valves and two mechanically actuatable valves.

In an alternative embodiment, the invention includes a system incorporating the assembly as described and at least one mechanically actuated valve. FIG. 3 is a schematic representation of this embodiment, where the system further includes two mechanically actuated valves 242a, 242b and the outlet is a kitchen sink faucet 217. Referring to FIG. 3, a cold water source 211a and a hot water source 211b are each in fluid communication with a pipe or conduit 213a and 213b respectively. The water is carried to the electromagnetically actuatable valves 215a and 215b (shown in the Figure in the open position), flowing to the mechanically actuated valves 242a, 242b, where they can be regulated by the user by application of mechanical force. The mechanically actuated valves may be any known or to be developed in the art. Indeed, it is contemplated that when the system is fabricated by retrofitting the assembly of the invention to a conventionally installed faucet system, the mechanically actuated valves will be of variable structure.

Although FIG. 3 illustrates the "hybrid" embodiment of the system having both conventional mechanical and touchless modes of fluid flow regulation where the mechanically operated valves are disposed downstream of the electromagnetically actuatable valves, it should be understood that the opposite arrangement could also be employed. Alternatively, the solenoid actuated valve(s) and the mechanically actuated valves could be located in a parallel configuration relative to one another as opposed to the serial configuration set shown in FIG. 3.

The mechanical/electromagnetic actuated hybrid embodiment of the invention exemplified in FIG. 3 permits mechanical operation of a faucet in a conventional manner using single or dual mechanically actuated valves to adjust water temperature and/or rate of flow and touchless, remote operation via the activator device. Manual operation is permitted by maintaining the solenoid actuated valves in an open state (if arranged in series relative to the mechanically actuated valves), thereby permitting water flow to the outlet or faucet. In this configuration, the system can be operated manually by opening the mechanically actuated valves by application of mechanical force by the user (as one does with all conventional faucets). Also, the mechanical valves may be placed in the closed position to prevent accidental activation of water flow via a misplaced or improperly handled activation device.

If the sensor of the activator unit is oriented such that a user is able to generate a stimulus within the zone of detection, the system will operate in touchless, "on demand" mode. In this mode, the mechanically-actuated valves may remain open, and the solenoid-actuated valves remain closed, unless the sensor detects a stimulus with its zone of detection. A stimulus entering the zone of detection causes the activator device to unit to transmit a signal to the receiver of the controller, resulting in the opening of the electromagnetically actuated valves and the resumption of water flow. The electromagnetically actuatable valves remain in open position. To touchlessly close the electromagnetically actuatable valves, and therefore stop the flow of water to the faucet, the user will generate a second stimulus within the zone of detection, which will result in the generation of a signal that is wirelessly transmitted to the receiver of the controller, causing the electromagnetically actuatable valve(s) to alternate to the closed position.

In addition, the activator device of the assembly may be configured to permit the user to switch from touchless operation to manual operation. In such embodiments, the activator device may have a structure that permits selective 'deactivation' of the zone of detection, such that the actuatable valve(s) will remain in open position to allow for manual regulation of the water flow by physical actuation of the mechanical valves. For example, if the sensor includes a radar-based motion detector or an infrared detector, the sensor may be incorporated into a housing that has a removable or retractable flap, door, cover or the like, that can be selectively used to cover the sensor, thereby deactivating the zone of detention and preventing the sensor from detecting any stimulus. Alternatively, the activator device can be configured so that it is possible to place and maintain the sensor against a planar surface, such as a countertop or table. For example, the activating unit can be configured in the form of a cube or solid cylinder with the sensor located in planar surface of the device.

In any of the embodiments disclosed herein, a time control may be optionally incorporated to automatically close the electromagnetically actuatable valves after the passage of a specified amount of time, for example, 1 minute, 2 minutes, 3 minutes, 4 minutes, 5 to 10 minutes, etc.

The invention also includes a kit to retrofit an existing fluid delivery system with a touchless assembly that facilitates remote control of a fluid flow between the fluid source and the outlet of the existing fluid delivery system. Such kit includes the assemblies as described herein and may also include materials that provide direction and guidance for installation. Such material may include written materials (either in hard copy of electric form) and video or audio materials (in the form of, for example, a digital file, a CD, a tape, etc.). Alternatively, the materials may be in the form of a website address that the installer may access via the internet, where written materials, audio and/or video providing the relevant information are available.

Figure 4:
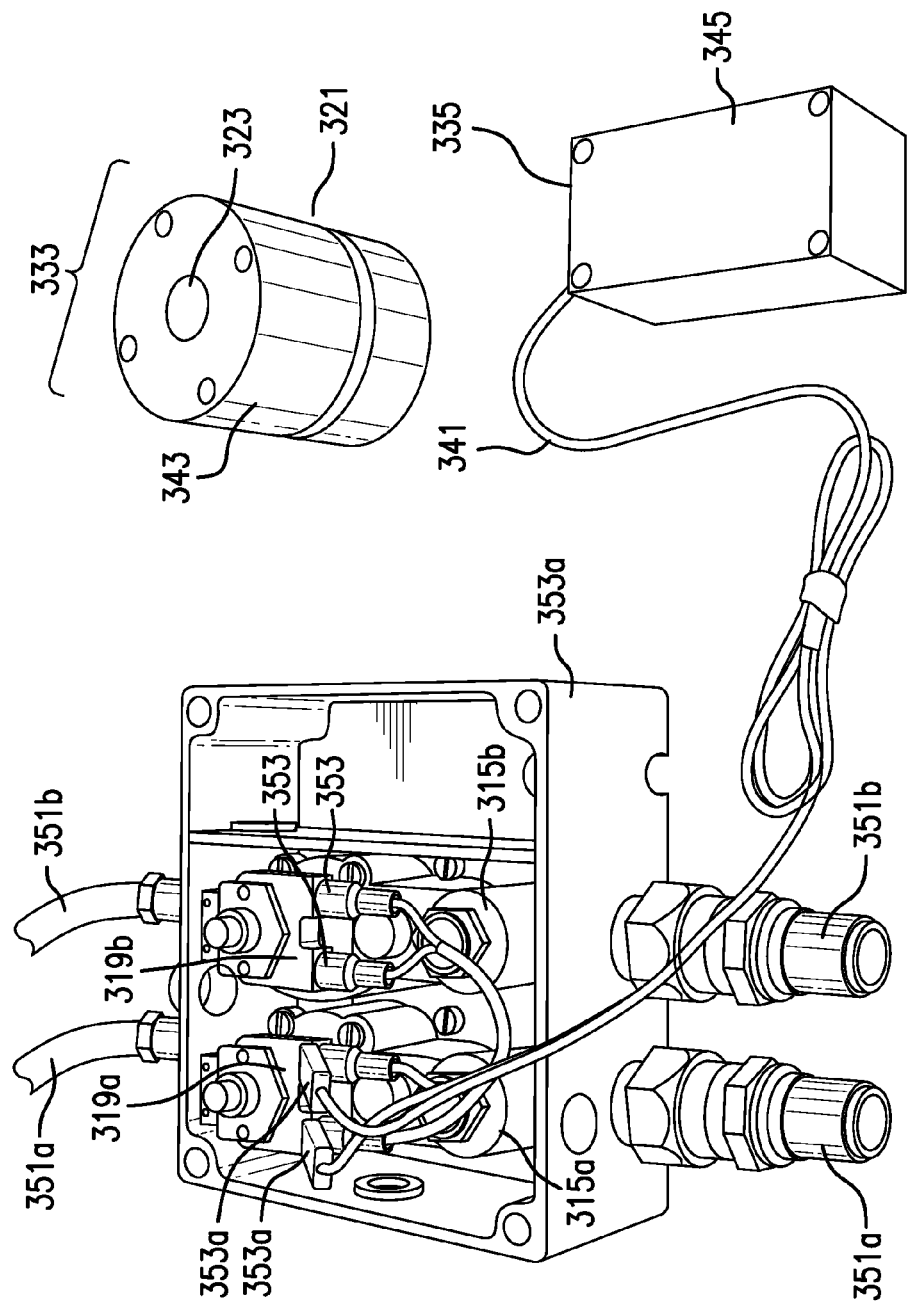
FIG. 4 is a representation of a kit of the invention.

Referencing FIG. 4, in a preferred embodiment, the kit may include an activator device 321 that contains a radio frequency transmitter and a battery (not visible), which are assembled with an infrared sensor 323 into an attractive housing 343. The housing may have any shape known or to be developed in the art; it may be preferred that is it is in a shape and size that facilitates ease of handling or that fits in the palm of an average adult's hand.

The sensor 323 is disposed in the housing so that the zone of detection 333 is adjacent to the top of the cylinder activator device 321, allowing for generation of a heat stimulus by a user in the zone of detection with relative ease.

The kit shown in FIG. 4 also includes a controller 335 that includes a controller housing 345, into which has been fitted a receiver and a battery (not shown). Also included in the kit are two solenoid actuated valves 315a, 315b, each of which is connected to a solenoid actuator 319a, 319b. The first electromagnetically actuated valve 319a is disposed upon a length of water line 351a, intended to be affixed to a cold water line upon installation. Similarly, the second electromagnetically actuated valve is disposed upon a length of water line 351b, intended to be affixed to a cold water line upon installation. The valve/actuator structures are arranged in a manifold and enclosed within a housing 353. The controller 335 is connected to each of the solenoid actuators 315a, 315b via conventional wiring and clips. It may be preferred that the wiring is of a significant length (e.g., 1 foot long to 10 feet long) to allow the installer flexibility in placement of the assembly upon installation.

FIGS. 5A-8 provide a schematic representation of an embodiment of the system of the invention. The system is illustrative of an embodiment where the activator device of the invention includes a user-activatable sensor that detects and is capable of distinguishing among at least two, three, four, five, six, seven, eight, nine or ten or more types of stimuli, including the absence of stimuli; a transmitter that transmits the wireless signal upon activation of the sensor by a user who generates any one of the stimuli to the receiver; and an orientation detector that can detect among at least two orientations of the activator device and which is operably connected to the sensor.

In the case of the exemplars of FIGS. 5A-8, the activator device 221 is housed in a cube-shaped housing 307 having a first side 309 and its orientation detector (not visible) is capable of distinguishing among at least three orientations. For example, when the first side 309 is facing upward as represented in FIG. 5A-C, the sensor (not shown) switches to a short range mode ("proximity" mode), wherein zone of detection extends no greater than about 12 inches around the sensor. In this mode, an initial application of the specific stimuli turns water flow on; a subsequent application of the specific stimuli turns water flow off.

Figure 7A:
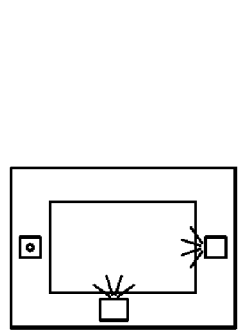
FIGS. 7A, 7B and 7C illustrate an additional embodiment of the invention wherein the activator device includes a position-sensitive sensor allowing for varied remote operation of the assembly in a third position.
Figure 7B:
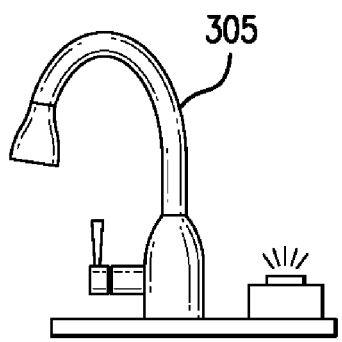
Figure 7C:
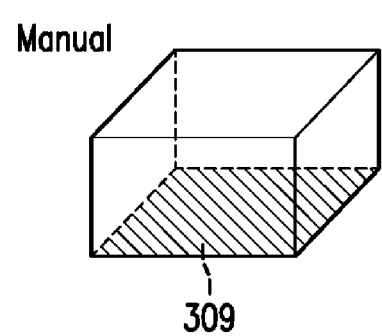

When the first side 309 is turned by about 90° so it is facing towards the side, as shown in FIG. 6A-C, the sensor switches to a long range mode (the zone of detection extends about 3 feet from the sensor). In this mode, an initial application of the specific stimuli turns water flow on; a subsequent application of the specific stimuli turns water flow off. When the first side 309 is turned by about 180° so it is facing downwards, as shown in FIG. 7A-C (with the housing shown as transparent for illustrative purposes), the sensor switches is "off", so that the faucet 305 can be operated in manual mode.

Figure 8:
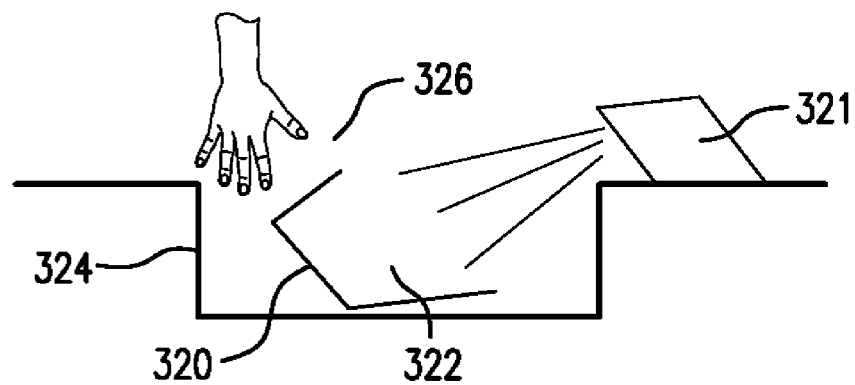
FIG. 8 shows a side view of a sink basin and a sensor illustrating an embodiment of the system where the sensor is disposed such that the presence of a hand or other object in the sink basin will act as stimuli.

In FIG. 8, it is illustrated a situation in which the activator device 221 has a housing with angled sides, such that the sensor can be orientated such that the zone of detection 320 is present in the middle portion of a space 322 defined by a sink basin 324 (shown in cross section) such that if an operator were to reach his hand 326 into the space 322, it would enter the zone of detection and activate or deactivate the sensor.

The housing 307 of FIGS. 5A-8 is illustrated as being a cube; however, the housing may be any three dimensional shape, for example, any polygonal prism. In some embodiments, irregular prisms may be preferred as such allow the side walls of the housing to be set at various angles for ease of use or user comfort or to permit orientation of the zone of detection in the desired direction.

Various embodiments may be contemplated for the shape of the housing, and/or the switch included in the activator device, such that the activator device can be configured to customize the sensors and resultant zones of detention orientation, depending on the desired end use. For example, in some embodiments without limitation, the activation device is fabricated so that when it is detached from home position can be placed on the edge of a sink basin with a sensor facing forward, to allow for long range detection of stimulus. In another embodiment, the housing may be in the form of a vertically rising rectangular prism, cylinder or other shape having a first substantially planar surface and a second substantially planar surface and in which an accelerometer or other position sensor is included. When the activator device is resting on its first surface (that is, the first surface is adjacent to the top surface of a counter, basin edge or worktop), water will flow; when the activator device is resting on its second surface, water flow will cease, and manual operation will be possible. Is some embodiments, the activator device is not secured or permanently affixed to the counter, basin edge, worktop, vanity or other structure.

Figures 9A, 9B:
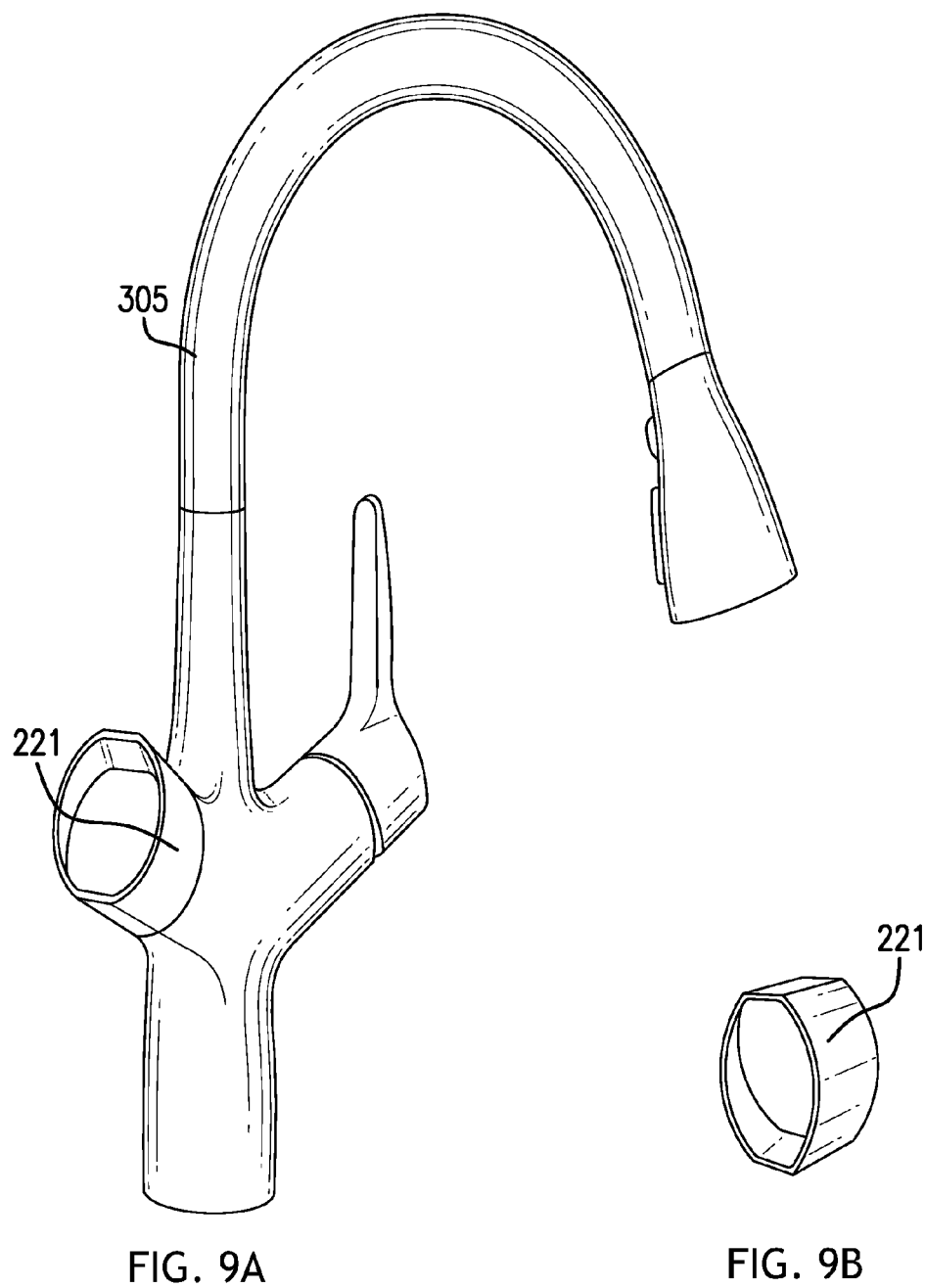
FIG. 9A is a representation of an additional embodiment of the invention illustrating a cradle-like structure that receives the activator device.
FIG. 9B represents the activator device of FIG. 9A.

In FIGS. 9A, 9B, a representation of the system of the invention having a detachably affixed activator device 221 that rests in a portion of the system that is shaped to receive the activator device. When the activator device 221 is maintained in the cradle (a first orientation), the sensor (not shown) switches to a short range mode ("proximity" mode), wherein zone of detection extends no greater than about 12 inches around the sensor. In this mode, an initial application of the specific stimuli turns water flow on; a subsequent application of the specific stimuli turns water flow off.

In this non-limiting example, when the activator device is removed from the cradle (orientation 2), the sensor may switch to a long range mode (the zone of detection extends about 3 feet from the sensor). Alternatively, when orientated so that the sensor faces upwardly, the sensor may switch to a shorter range mode (e.g., zone of detection extends up to 1 foot from sensor). In this mode, an initial application of the specific stimuli turns water flow on; a subsequent application of the specific stimuli turns water flow off.

In the embodiment illustrated in FIGS. 9A and 9B, the sensor can be oriented by rotating it around its longitudinal axis such that its zone of detection extends into the sink (activatable, therefore, by the presence of a dirty dish), to the front, or any other direction that the user prefers.

Figure 10A:
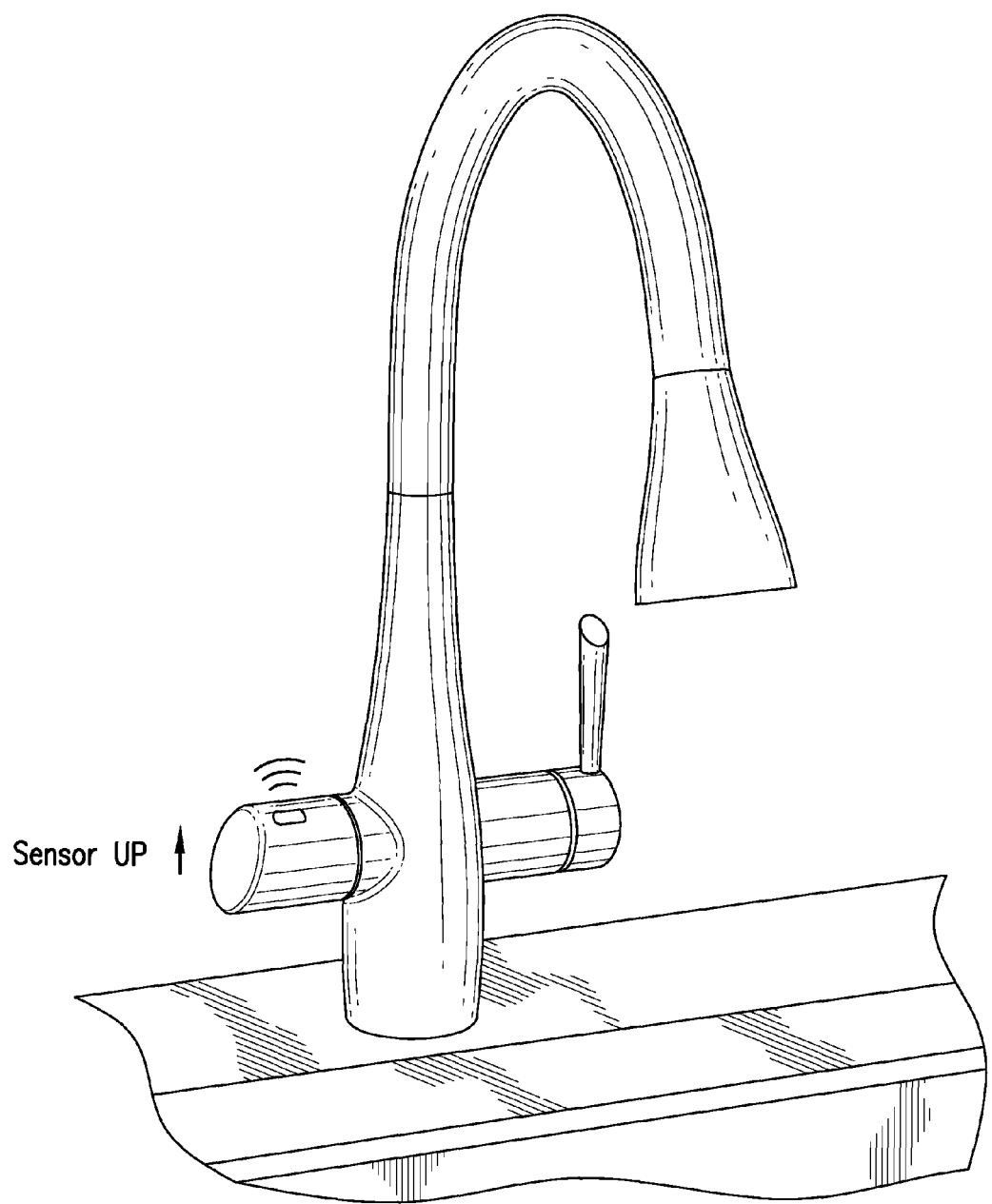
FIGS. 10A-10B schematically illustrate an additional embodiment of the invention where the activator device includes an orientation detector is detachably affixed to the assembly and can be operated on the assembly or detached from the assembly.
Figure 10B:
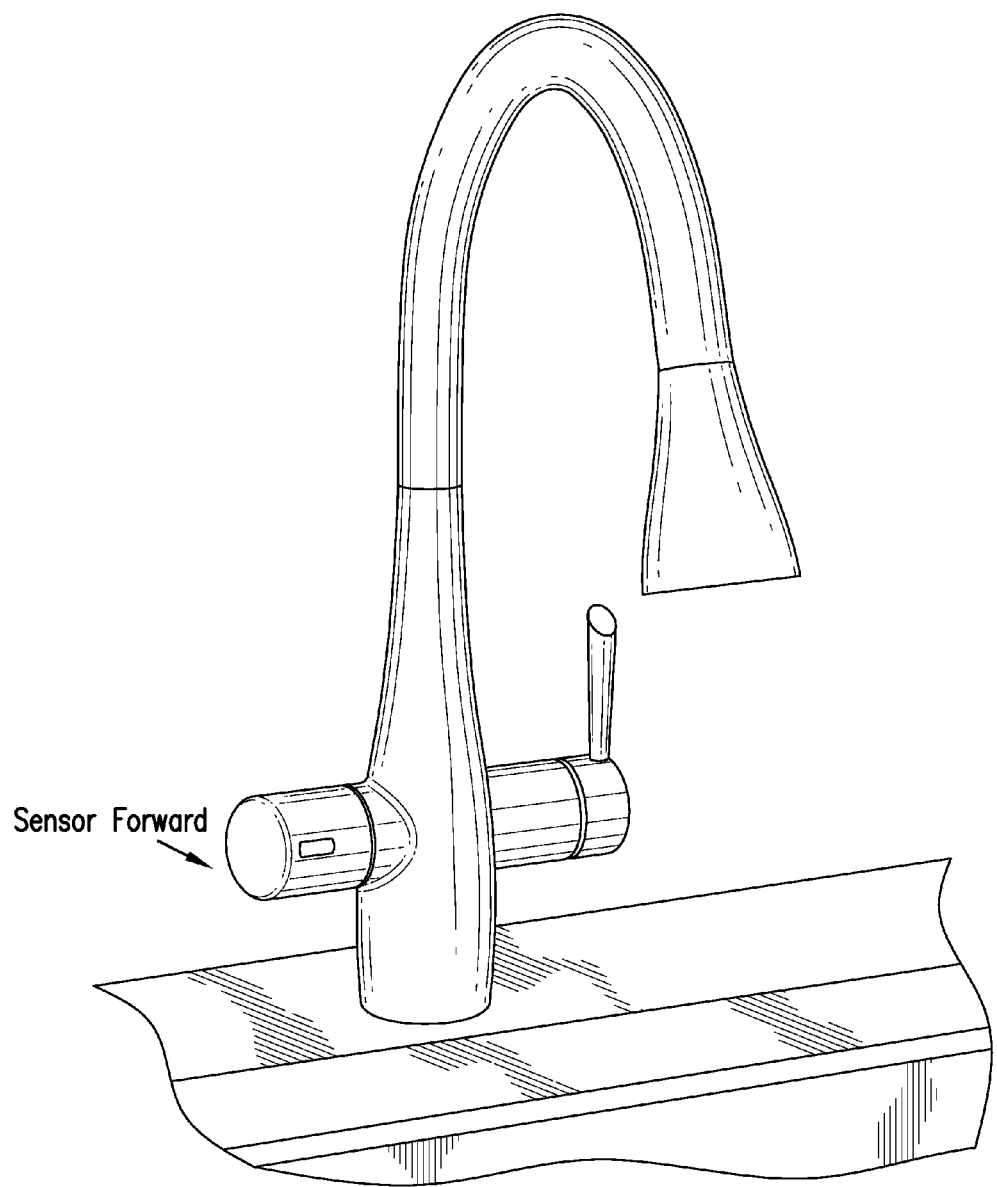
Figure 10C:
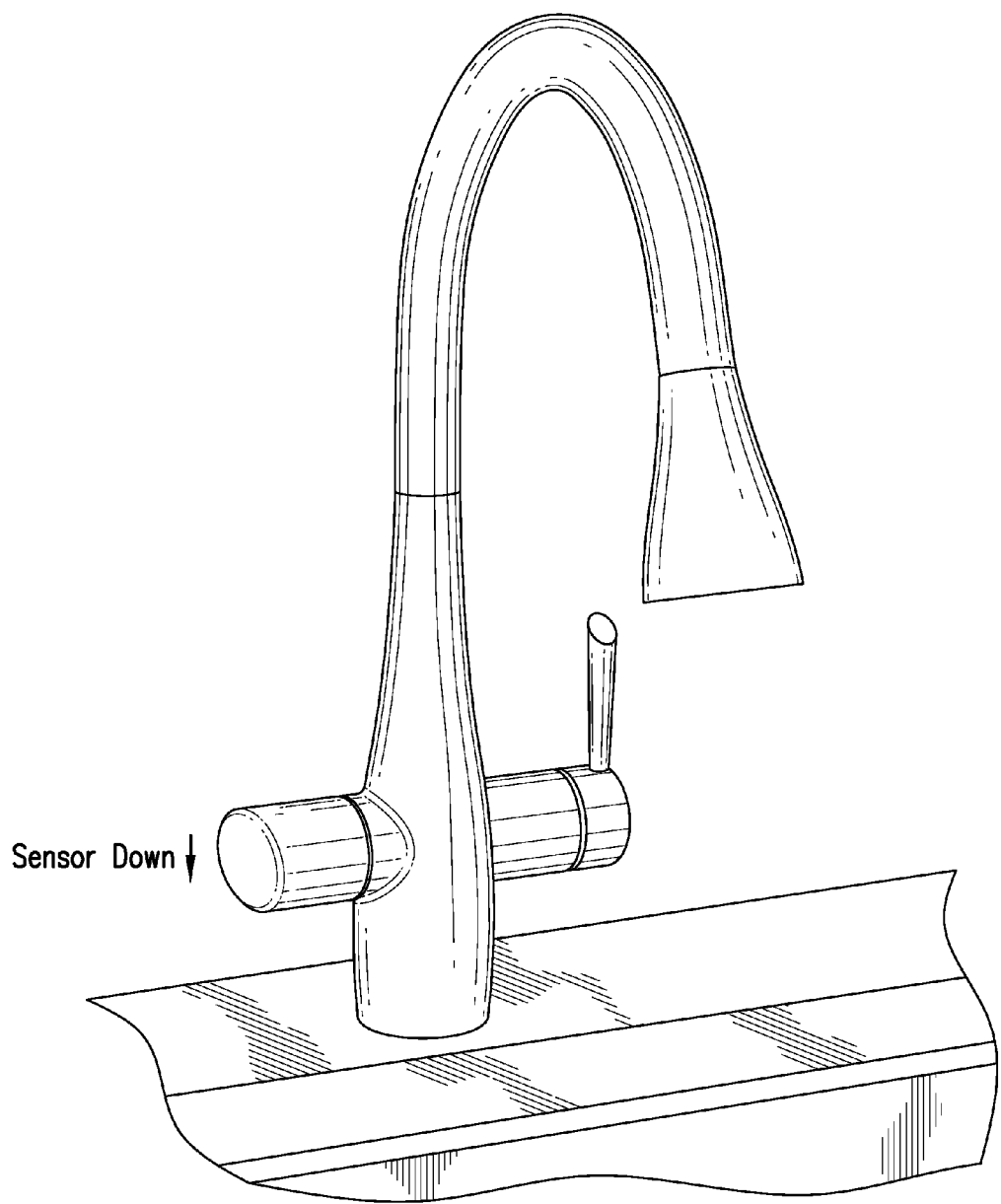
FIG. 10C illustrates activation on the assembly, in an "down" position.
Figure 10D:
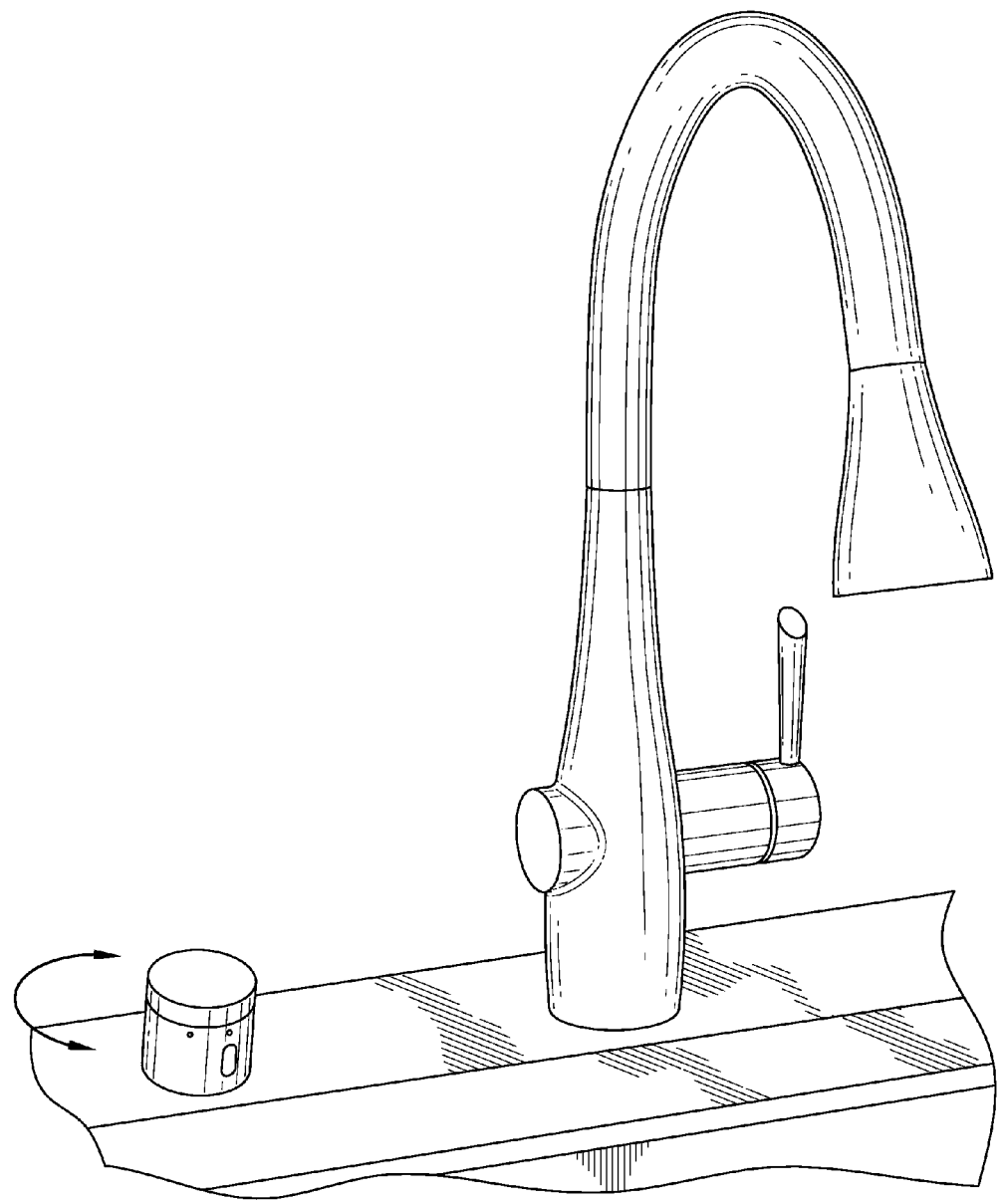
FIG. 10D illustrates activation detached from the assembly.

In an additional embodiment that is a refinement of the embodiment of FIGS. 9A-B, the activator device can further include an indicator device 317 (FIGS. 10A-D) that is stationary relative to the activator device, but permits the detachably affixed activator device to rotate around its longitudinal axis. For example, as is illustrated in FIGS. 10A-D, the indicator device may be in the form of a collar that is adjacent to a side of the activator device, or encircles, for example, concentrically encircles, the activator device, that is rotated around its longitudinal axis such that the zone of detection of the sensor extends in an upwards direction, the sensor is in a short range, proximity mode. When, for example, the activator device is rotated around its longitudinal axis such that the sensor's zone of detection extends upwards, the water flow may be turned on or off when a stimulus enters the zone, as is illustrated in FIG. 10A. When, for example, the activator device is rotated around its longitudinal axis such that the sensor's zone of detection extends forward or points towards the user, the sensor is in the automatic zone mode and fluid flow may be turned "on" or "off" when a stimulus enters the zone of detection, as is illustrated in FIG. 10B. When, for example, the activator device is rotated around its longitudinal axis such that the sensor's zone of detection extends downwardly or is opposite the user, the sensor may be "off" and the faucet will be in manual mode, as is shown in FIG. 10C. Alternatively, the activator device (with or without indicator device) can be removed from the cradle or home position, and placed in various locations near the water source to customize the location of the zone of detection, as is shown in FIG. 10D. This creates a situation where the zone may be pointing into the basin of a sink, so that a hand or other object will activate/deactivate the sensor when it is placed in the sink basin.

Also included within the scope of the invention are methods by which a user touchlessly or wirelessly regulates the delivery of a fluid from a fluid source to an outlet comprising generating a stimulus with a zone of detection of a user-activatable sensor that is in operable communication with a transmitter and the generation of the stimulus causes a signal to transmitted by the transmitter by a receiver, the receiver being operably connected to a solenoid actuator, which actuates an electromagnetically actuatable valve that is disposed between the fluid source and the faucet, causing the valve to actuate from a first position to a second position, thereby regulating water flow.

Numerous variations of the disclosed systems, assemblies and methods can be prepared by mix and matching the various components disclosed herein. Such permutations are well within the scope of the person of skill in the art.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An assembly for remotely controlling fluid flow between a fluid source and an outlet comprising:
at least one electromagnetically-actuatable valve to be interposed between the fluid source and the outlet, the valve being actuatable between an open position, in which the source and the outlet are fluidly connected, and a closed position in which the source and the outlet are not fluidly connected;
at least one solenoid actuator operably connected to the at least one electromagnetically-actuatable valve for actuating the electromagnetically-actuatable valve between the open and closed positions,
a controller comprising a receiver for receiving a wireless signal, wherein the controller is operably connected to the solenoid actuator and capable of actuating the solenoid actuator upon receipt of a wireless signal by the receiver; and
an activator device comprising (i) a user-activatable sensor for detecting a stimulus, (ii) a transmitter that transmits the wireless signal upon activation of the sensor by a user to the receiver, and (iii) an orientation detector that can detect among at least two orientations of the activator device and which is operably connected to the sensor, wherein the activator device is moveable such that the activator device can be moved to any location,
wherein when the activator device is in a first orientation, a zone of detection of the sensor extends no farther than a predetermined distance from the sensor, and when the activator is in a second orientation, the zone of detection extends farther than the predetermined distance from the sensor.

2. The assembly of claim 1, further comprising a first electromagnetically-actuatable valve operably connected to a first solenoid actuator and a second electromagnetically-actuatable valve operably connected to a second solenoid actuator.

3. The assembly of claim 1, wherein the sensor is an infrared detector.

4. The assembly of claim 1, wherein the signal is a radio frequency signal.

5. The assembly of claim 1, wherein the at least one electromagnetically-actuatable valve is also a mechanically actuatable valve(s).

6. The assembly of claim 1 wherein, the activator device is detachably affixed to the assembly.

7. The assembly of claim 1, wherein the orientation detector is an accelerometer.

8. The assembly of claim 1, wherein the orientation detector is chosen from an electronic detector, an electromagnetic detector, an electro-mechanical detector, a rotational angle sensor, and a position switch.

9. The assembly of claim 1, wherein the sensor comprises an optical sensor and an infrared sensor.

10. The assembly of claim 1, wherein the activator device comprises a housing in the form of a polygonal prism having a first side, wherein at the first orientation the first side is oriented upwardly, and at the second orientation, the first side is oriented about 90° relative to the first orientation.

11. The assembly of claim 1, wherein:
the orientation detector can detect among at least three orientations of the activator device; and
when the activator device is in a third orientation, the sensor is deactivated.

12. The assembly of claim 1, wherein the sensor is capable of detecting and distinguishing among at least two stimuli.

13. An assembly for remotely controlling water flow between a water source and a faucet or shower head comprising:
- at least one electromagnetically-actuatable valve to be interposed between the water source and the faucet or shower head, the valve being actuatable between an open position, in which the water source and the faucet are fluidly connected, and a closed position in which the water source and the faucet are not fluidly connected;
- at least one solenoid actuator operably connected to the at least one electromagnetically-actuatable valve for actuating the electromagnetically-actuatable valve between the open and closed positions,
- a controller comprising a receiver for receiving a wireless signal, wherein the controller is operably connected to the solenoid actuator and capable of actuating the solenoid actuator upon receipt of a wireless signal by the receiver;
- an activator device comprising (i) a user-activatable sensor for detecting a stimulus, (ii) a transmitter that transmits the wireless signal upon activation of the sensor by a user to the receiver, and (iii) an orientation detector that can detect among at least two orientations of the activator device and which is operably connected to the sensor, wherein the activator device is moveable such that the activator device can be moved to any location,
- wherein when the activator device is in a first orientation, a zone of detection of the sensor extends no farther than a predetermined distance from the sensor, and when the activator is in a second orientation, the zone of detection extends farther than the predetermined distance from the sensor.

14. The assembly of claim 13, further comprising a first electromagnetically-actuatable valve operably connected to a first solenoid actuator and a second electromagnetically-actuatable valve operably connected to a second solenoid actuator.

15. The assembly of claim 13, wherein the sensor is an infrared detector.

16. The assembly of claim 13, wherein the signal is a radio frequency signal.

17. The assembly of claim 13, wherein the activator device is detachably affixed to the assembly.

18. An assembly for remotely controlling fluid flow between a cold water source and a hot water source and an outlet comprising:
- a first electromagnetically-actuatable valve to be interposed between the hot water source and the outlet, the first valve being actuatable between an open position, in which the hot water source and the outlet are fluidly connected, and a closed position in which the hot water source and the outlet are not fluidly connected;
- a second electromagnetically-actuatable valve to be interposed between the cold water source and the outlet, the second valve being actuatable between an open position, in which the cold water source and the outlet are fluidly connected, and a closed position in which the cold water source and the outlet are not fluidly connected;
- a first solenoid actuator operably connected to the first electromagnetically-actuatable valve for actuating the first electromagnetically-actuatable valve between the open and closed positions,
- a second solenoid actuator operably connected to the second electromagnetically-actuatable valve for actuating the second electromagnetically-actuatable valve between the open and closed positions,
- a controller comprising a receiver for receiving a wireless signal, wherein the controller is operably connected to each of the first solenoid actuator and the second solenoid actuator and capable of actuating each of the solenoid actuators substantially simultaneously upon receipt of a wireless signal by the receiver;
- an activator device comprising (i) a user-activatable sensor for detecting a stimulus, (ii) a transmitter that transmits the wireless signal upon activation of the sensor by a user to the receiver, and (iii) an orientation detector that can detect among at least two orientations of the activator device and which is operably connected to the sensor, wherein the activator device is moveable such that the activator device can be moved to any location,
- wherein when the activator device is in a first orientation, a zone of detection of the sensor extends no farther than a predetermined distance from the sensor, and when the activator is in a second orientation, the zone of detection extends farther than the predetermined distance from the sensor.

19. The assembly of claim 18, wherein the signal is a radio frequency signal.

20. A system to control water flow between a fluid source and an outlet comprising:
- at least one electromagnetically-actuatable valve interposed between the fluid source and the outlet, the valve is actuatable between an open position and a closed position;
- at least one solenoid actuator operably connected to the at least one electromagnetically-actuatable valve for actuating the electromagnetically-actuatable valve between the open and closed positions;
- a controller comprising a receiver for receiving a wireless signal, wherein the controller is operably connected to the solenoid actuator and capable of actuating the solenoid actuator upon receipt of a wireless signal by the receiver;
- an activator device comprising (i) a user-activatable sensor for detecting a stimulus, (ii) a transmitter that transmits the wireless signal upon activation of the sensor by a user to the receiver, and (iii) an orientation detector that can detect among at least two orientations of the activator device and which is operably connected to the sensor, wherein the activator device is moveable such that the activator device can be moved to any location,
- wherein when the activator device is in a first orientation, a zone of detection of the sensor extends no farther than a predetermined distance from the sensor, and when the activator is in a second orientation, the zone of detection extends farther than the predetermined distance from the sensor; and
- at least one mechanically actuatable valve interposed between the fluid source and the outlet, wherein the mechanically actuatable valve is actuatable between an open position and a closed position;
- wherein, when the at least one electromagnetically actuatable valve is maintained in the open position, a user can regulate fluid flow to the outlet using the at least one mechanically actuatable valve and when the at least one mechanically actuatable valve is maintained in an open position, a user can regulate the fluid flow to the outlet by generating a stimulus in the zone of detection.

21. The system of claim 20, further comprising a first electromagnetically-actuatable valve operably connected to a first solenoid actuator and a second electromagnetically-actuatable valve operably connected to a second solenoid actuator.

22. The system of claim 20, wherein the at least one electromagnetically actuatable valve and the at least one mechanically actuatable valve are arranged in series.

23. The system of claim 20, wherein the at least one electromagnetically-actuatable valve and the at least one mechanically actuatable valve are arranged in parallel.

24. The system of claim 20, wherein the sensor is an infrared detector.

25. The system of claim 20, wherein the signal is a radio frequency signal.

26. The assembly of claim 20, wherein the activator device is detachably affixed to the assembly.

27. An assembly for remotely controlling fluid flow between a fluid source and an outlet comprising:
    at least one electrically operable valve to be interposed between the fluid source and the outlet, the valve being actuatable between an open position, in which the source and the outlet are fluidly connected, and a closed position in which the source and the outlet are not fluidly connected;
    at least one actuator operably connected to the at least one electrically operable valve for actuating the valve between the open and closed positions,
    a controller comprising a receiver for receiving a wireless signal, wherein the controller is operably connected to the actuator and capable of actuating the actuator upon receipt of a wireless signal by the receiver; and
    an activator device comprising (i) a user-activatable sensor for detecting a stimulus, (ii) a transmitter that transmits the wireless signal upon activation of the sensor by a user to the receiver, and (iii) an orientation detector that can detect among at least two orientations of the activator device and which is operably connected to the sensor, wherein the activator device is moveable such that the activator device can be moved to any location,
    wherein when the activator device is in a first orientation, a zone of detection of the sensor extends no farther than a predetermined distance from the sensor, and when the activator is in a second orientation, the zone of detection extends farther than the predetermined distance from the sensor.

28. The assembly of claim 27, wherein the electrically operable valve is an electro-mechanical valve.

29. The assembly of claim 27, wherein the electrically operable valve is an electromagnetically-actuatable valve and the actuator is a solenoid actuator.

30. An assembly for remotely controlling water flow between a water source and a faucet or shower head comprising:
    at least one electrically operable valve to be interposed between the water source and the faucet or shower head, the valve being actuatable between an open position, in which the water source and the faucet are fluidly connected, and a closed position in which the water source and the faucet are not fluidly connected;
    at least one actuator operably connected to the at least one valve for actuating the at least one electrically operable valve between the open and closed positions,
    a controller comprising a receiver for receiving a wireless signal, wherein the controller is operably connected to a solenoid actuator and capable of actuating the actuator upon receipt of a wireless signal by the receiver;
    an activator device comprising (i) a user-activatable sensor for detecting a stimulus, (ii) a transmitter that transmits the wireless signal upon activation of the sensor by a user to the receiver, and (iii) an orientation detector that can detect among at least two orientations of the activator device and which is operably connected to the sensor, wherein the activator device is moveable such that the activator device can be moved to any location,
    wherein when the activator device is in a first orientation, a zone of detection of the sensor extends no farther than a predetermined distance from the sensor, and when the activator is in a second orientation, the zone of detection extends farther than the predetermined distance from the sensor.

31. The assembly of claim 30, wherein the electrically operable valve is an electro-mechanical valve.

32. The assembly of claim 30, wherein the electrically operable valve is an electromagnetically-actuatable valve and the actuator is a solenoid actuator.

33. An assembly for remotely controlling fluid flow between a cold water source and a hot water source and an outlet comprising:
    a first electrically operable valve to be interposed between the hot water source and the outlet, the first valve being actuatable between an open position, in which the hot water source and the outlet are fluidly connected, and a closed position in which the hot water source and the outlet are not fluidly connected;
    a second electrically operable valve to be interposed between the cold water source and the outlet, the second valve being actuatable between an open position, in which the cold water source and the outlet are fluidly connected, and a closed position in which the cold water source and the outlet are not fluidly connected;
    a first actuator operably connected to the first valve for actuating the first electrically operable valve between the open and closed positions,
    a second actuator operably connected to the second electrically operable valve for actuating the second valve between the open and closed positions,
    a controller comprising a receiver for receiving a wireless signal, wherein the controller is operably connected to each of the first actuator and the second actuator and capable of actuating each of the actuators substantially simultaneously upon receipt of a wireless signal by the receiver;
    an activator device comprising (i) a user-activatable sensor for detecting a stimulus, (ii) a transmitter that transmits the wireless signal upon activation of the sensor by a user to the receiver, and (iii) an orientation detector that can detect among at least two orientations of the activator device and which is operably connected to the sensor, wherein the activator device is moveable such that the activator device can be moved to any location,
    wherein when the activator device is in a first orientation, a zone of detection of the sensor extends no farther than a predetermined distance from the sensor, and when the activator is in a second orientation, the zone of detection extends farther than the predetermined distance from the sensor.

\* \* \* \* \*